United States Patent [19]
Tanaka et al.

[11] Patent Number: 5,373,504
[45] Date of Patent: Dec. 13, 1994

[54] APPARATUS AND A METHOD FOR SETTING A COMMUNICATION PATH

[75] Inventors: Kenji Tanaka; Susumu Eda; Katsumi Oomuro; Ryuji Hyodo; Osamu Sekihata; Hiroyuki Hatta; Reiko Norizuki, all of Kawasaki, Japan

[73] Assignee: Fujitsu Limited, Kawasaki, Japan

[21] Appl. No.: 44,490

[22] Filed: Apr. 9, 1993

[30] Foreign Application Priority Data

Apr. 9, 1992 [JP] Japan ................................ 4-088695

[51] Int. Cl.[5] ............................................ H04L 12/50
[52] U.S. Cl. ...................................... 370/60.1; 370/13
[58] Field of Search ................... 370/44.1, 60, 60.1, 370/17, 13, 15, 84, 95.1; 371/69.1, 11.2, 11.1, 5.1, 5.3

[56] References Cited

U.S. PATENT DOCUMENTS 5,187,708  2/1993  Nakatani et al. ................... 370/94.1
5,231,633  7/1993  Hluchyj et al. ..................... 370/94.1

*Primary Examiner*—Douglas W. Olms
*Assistant Examiner*—Dang Ton
*Attorney, Agent, or Firm*—Staas & Halsey

[57] ABSTRACT

An apparatus for setting a communication path in ATM communication, comprises: communication path control unit for indicating a communication path test before starting communication; test cell assembling unit for assembling test cells that consist of a series of cells each of which has a sequential number for detecting test cell discard and has the higher cell discard priority (CLP=1); communication path setting unit for setting up the communication path and replacing transmit idle cells with the test cells; and cell-discard detecting unit for comparing the sequential number contained in received test cells with the number of the received test cells and thereby outputting a communication path setting enable or disable control signal.

19 Claims, 14 Drawing Sheets

Fig. 7
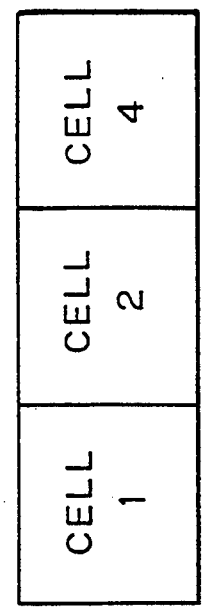
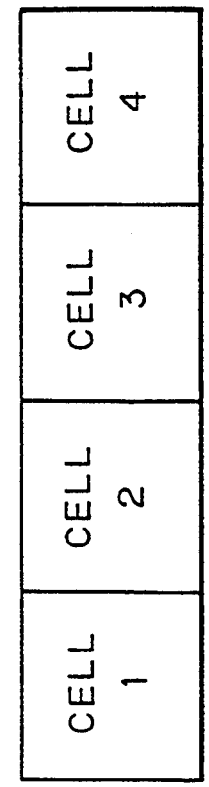
CONGESTION

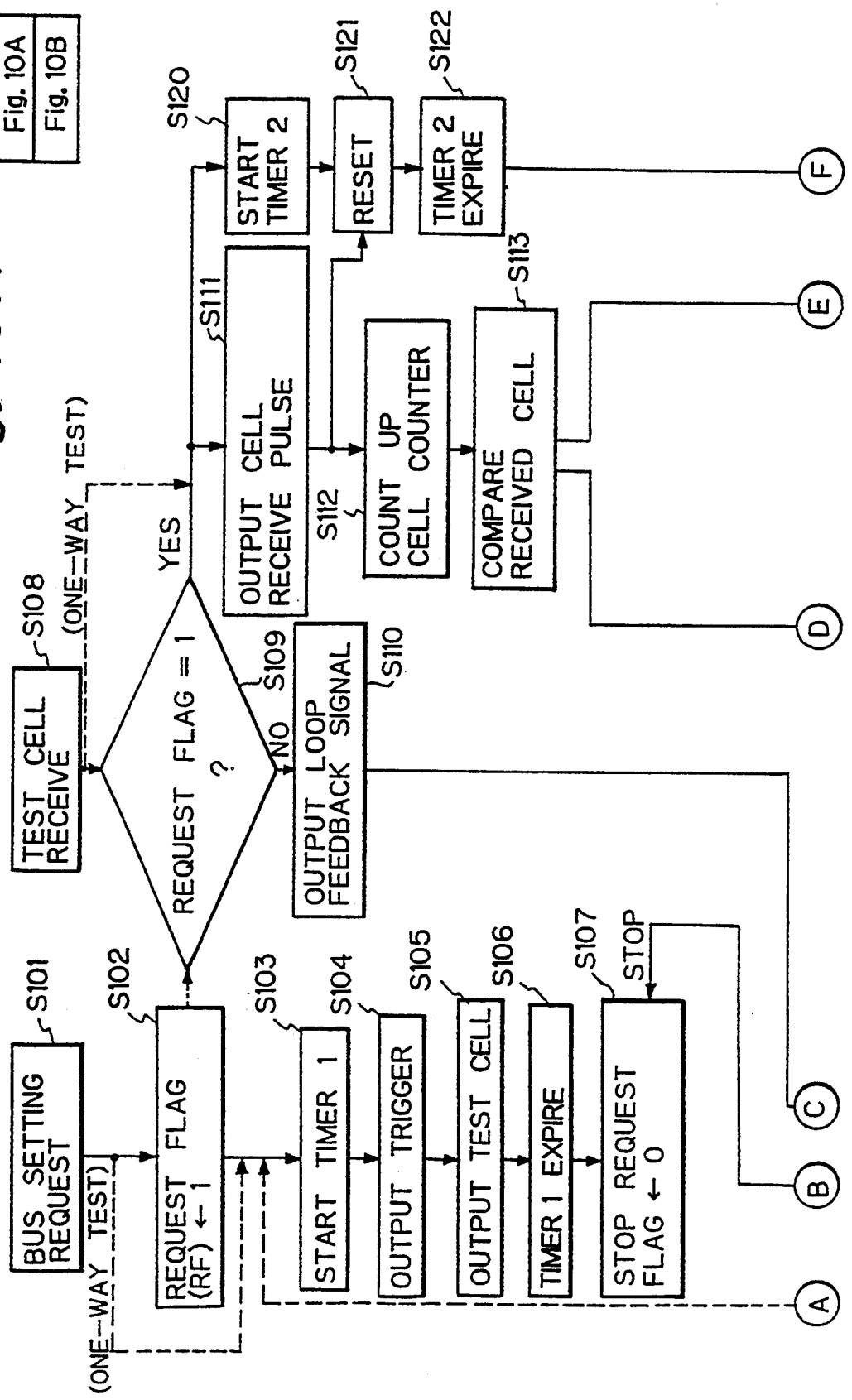

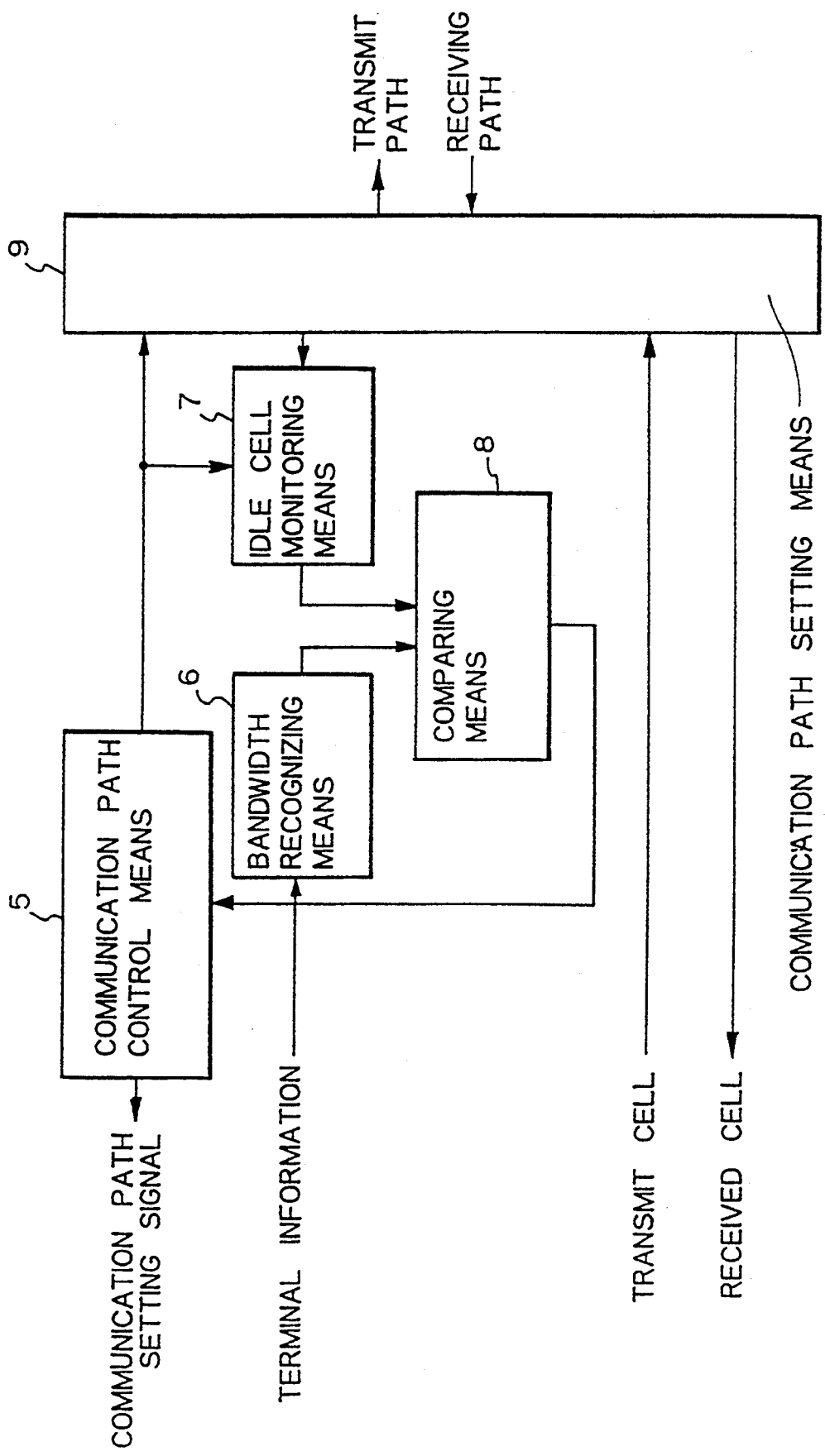

APPARATUS AND A METHOD FOR SETTING A COMMUNICATION PATH

BACKGROUND OF THE INVENTION

1. Field of the Invention

The present invention relates to communication control between communication nodes in asynchronous transfer mode (ATM) communication, and more particularly to an apparatus and a method for setting a communication path to prevent occurrence of congestion by detecting or monitoring traffic condition.

ATM is a specific packet oriented transfer mode using an asynchronous time division multiplexing technique. The multiplexed information flow is organized in fixed size blocks, called cells (ATM cell). An ATM cell consists of an information field and a header. The primary role of the header is to identify cells belonging to the same virtual path and virtual channel (VP/VC) connection. Cells are assigned on demand, depending on the source activity and the available resources. Cell sequence integrity on a virtual channel connection is preserved by the ATM Layer.

2. Description of the Prior Art

In recent years, B-ISDN (Broadband-Integrated Service Digital Network) has been emerging as the next generation public network, and with the deployment of the B-ISDN, even more flexible broadband communication networks than before are being realized which provide such differing services such as voice communications, very high speed file transfer, information communications, communications between LANs, moving images, and even moving image services of high-definition television (HDTV). ATM communication technology that can handle such multimedia is used in the B-ISDN.

In a B-ISDN network, a user terminal is connected to a communication node via a user network interface (UNI). Each communication node is connected to other communication nodes via node network interfaces (NNIs) and digital service units (DSUs) for high speed asynchronous transmission of ATM cells. Each communication node contains ATM adaptation layers (AALs) and ATM switches. The AALs perform ATM cell assembly and disassembly between the user terminals and the ATM switches. Data from each user terminal is broken up into a plurality of ATM cells by the AAL and a communication path is set up by the ATM switch.

Using the header data in each ATM cell, the ATM switch performs high speed switching operation by hardware. If communication path congestion is detected by the ATM switch during communication, the ATM switch discards part of the data transmitted from the transmitting user terminal. In this case, the ATM switch checks the CLP (cell loss priority) control bit in the ATM cell header and preferentially discards cells whose CLP value is "1".

For voice cells which generally have a high level of redundancy and are therefore less affected by cell discarding, the CLP is set to "1", whereas for other cells such as data, modem, facsimile data, etc., the CLP is set to "0".

As described above, since cell discarding occurs in ATM communication, it is necessary to have means for predicting abrupt occurrence of congestion by monitoring traffic information, and thereby, suitably exchanging a communication path.

SUMMARY OF THE INVENTION

It is all object of the invention to prevent abrupt discard of cells such as described above, by outputting test cells which are assembled as pseudo cells assigned to the higher cell-discard priority (CLP=1) onto a communication path to detect the rate of occurrence of cell discarding.

It is another object of the invention to enable making a decision whether a communication path has a transmission capacity for transmitting new input cells or not, by monitoring the number of idle cells flowing through the communication path.

According to the present invention, there is provided an apparatus for setting a communication path in ATM communication which comprises: communication path control means for indicating a communication path test before starting communication and performing path setting control of said communication path in accordance with a communication path setting signal and a communication path setting enable or disable control signal; test cell assembling means for assembling test cells that consist of a series of cells each of which has a sequential number for detecting test cell-discard and has the higher cell-discard priority (CLP=1) in accordance with test indication from said communication path control means; communication path setting means for setting up said communication path and replacing transmit idle cells with said test cells to perform said communication path test in accordance with said path setting control by said communication path control means; and cell-discard detecting means for outputting said communication path setting enable control signal when deciding no occurrence of said test cell-discard by a response to said communication path test sent from a destination communication node whereas outputting said communication path setting disable control signal when detecting occurrence of said test cell-discard by said response.

Further, according to the present invention, there is provided an apparatus for setting a communication path in ATM communication which comprises: communication path control means for indicating a communication path before setting said communication path and performing path setting control of said communication path in accordance with a communication path setting signal and a communication path setting enable or disable control signal; communication path setting means for setting up said communication path in accordance with an indication of path setting provided by said communication path control means; bandwidth recognizing means for recognizing a communication bandwidth of a terminal equipment connected to said communication path; idle cell monitoring means for monitoring the number of idle cells flowing through said communication path set by said communication path setting means for a predetermined time; and comparing means for comparing a bandwidth corresponding to said number of idle cells provided by said idle cell monitoring means with said communication bandwidth of a terminal equipment provided by said bandwidth recognizing means and outputting said communication path setting enable control signal if said bandwidth corresponding to said number of idle cells is greater than said communication bandwidth of a terminal equipment or outputting said communication path setting disable control signal if said bandwidth corresponding to said number of idle cells is smaller than said communication bandwidth of a terminal equipment.

BRIEF DESCRIPTION OF THE DRAWINGS

The present invention will be more clearly understood from the description as set forth below with reference to the accompanying drawings.

FIG. 7 is a diagram for explaining a method for detecting test cell-discard by way of counting a series of test cell numbers.

FIG. 10 is a flowchart showing the positional orientation of FIG. 10(A) and 10(B).

FIG. 10(A) and 10(B) are flowcharts showing control flow of an AAL shown in FIG. 9.

FIG. 11 is a block diagram showing a basic configuration (2) of a communication path setting apparatus according to the invention.

DESCRIPTION OF THE PREFERRED EMBODIMENTS

Before describing the preferred embodiments according to the present invention, examples of the related art are provided with reference to accompanying drawings (from FIG. 1 to FIG. 4).

Figure 1:
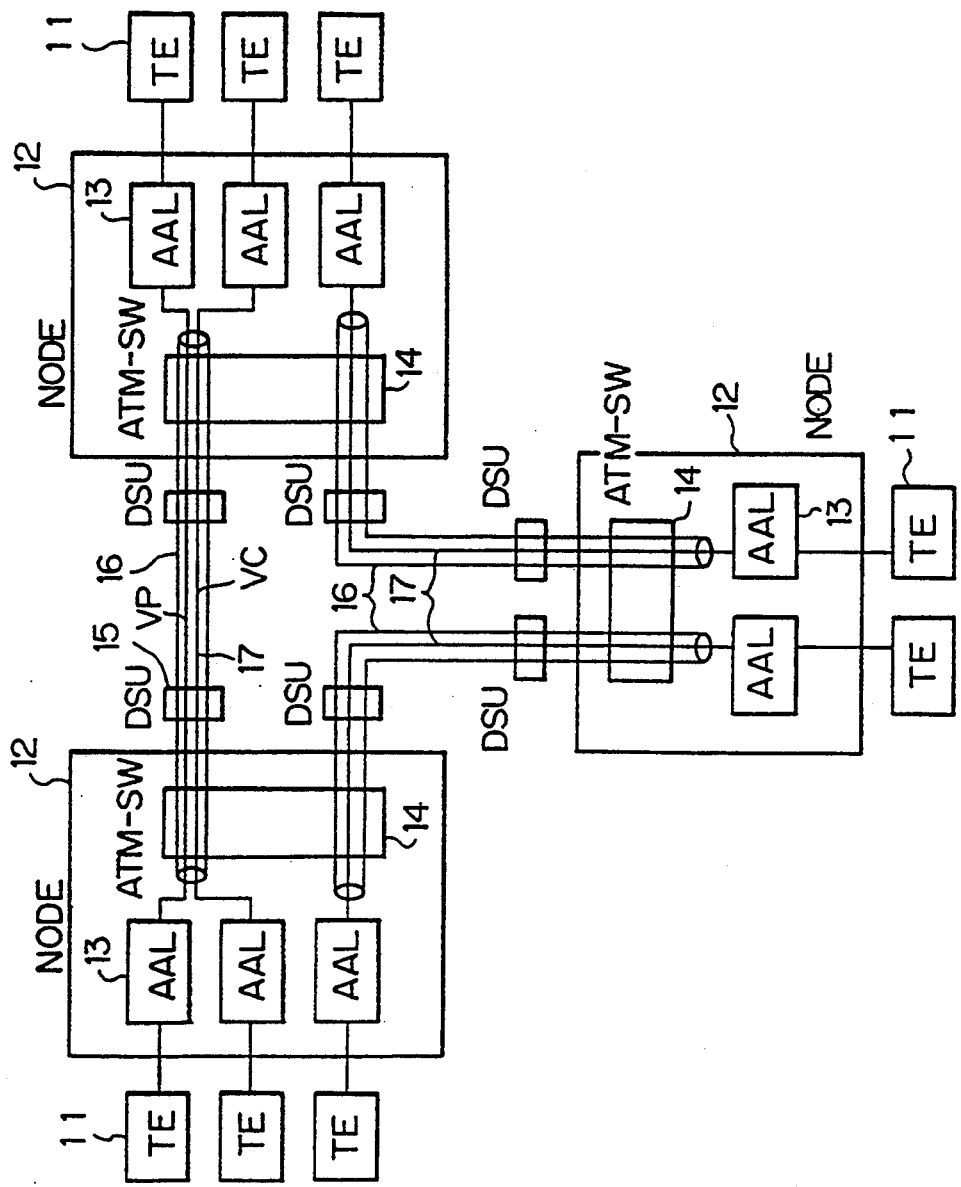
FIG. 1 is a diagram illustrating an example of an ATM communication network.

FIG. 1 is a schematic diagram illustrating how communications are performed between nodes in the B-ISDN as described above.

In FIG. 1, a user terminal (TE) 11 is connected to a communication node 12 via a user network interface (UNI). Each communication node is connected to other communication node via node network interfaces (NNIs) and digital service units (DSUs) 15 for high speed asynchronous transmission of ATM cells. Each communication node 12 contains ATM adaptation layers (AALs) 13 and ATM switches (ATM-SW) 14. The AALs 13 perform ATM cell assembly and disassembly between the user terminals 11 and the ATM switches 14. Data from each user terminal 11 is broken up into a plurality of ATM cells.

Figure 2:
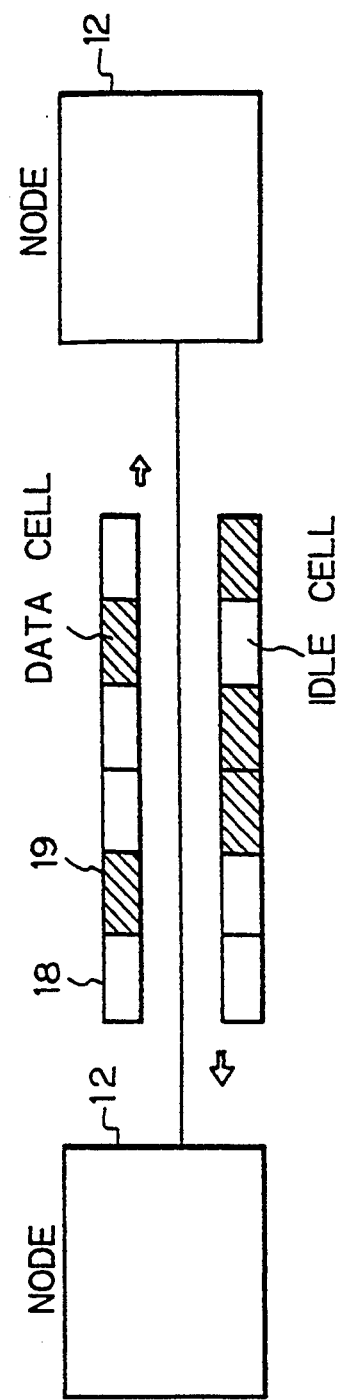
FIG. 2 is a diagram illustrating an example of ATM cells transferred between communication nodes.

FIG. 2 is a schematic diagram illustrating an example of ATM cells transferred on a transmission line between communication nodes.

In FIG. 2, a cell 18 is illustrated with a blank and shows an idle cell that is used to delineate a boundary between adjacent cells. A cell 19 is illustrated with diagonal lines and shows an information cell, such as a voice cell, a data cell, etc., that carries valid information. For example, when beginning data transmission, at the communication node 12, transmit data is divided into cells data and information cells 19 are assembled from the cells data. Each information cell 19 is asynchronously inserted into one of the free time-slots that are filled with idle cells 18, and thereafter transferred on a transmission line between communication nodes 12.

Figure 3:
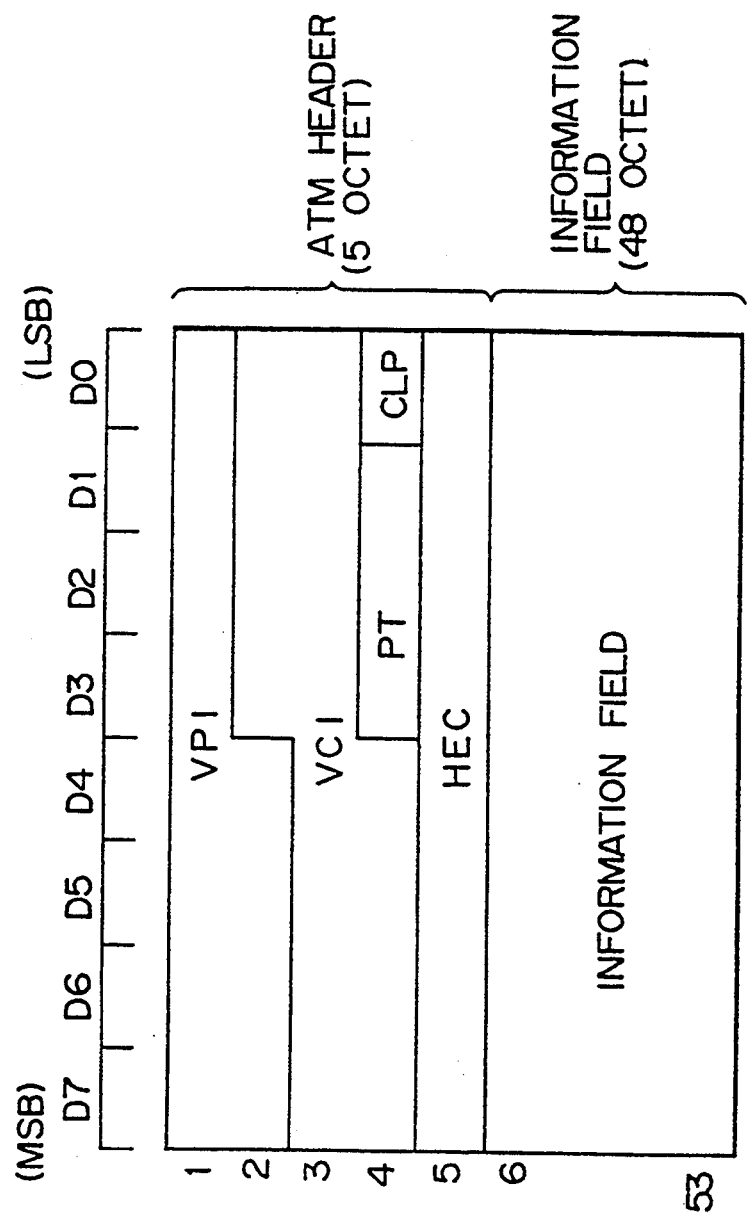
FIG. 3 is a diagram showing a basic format of an ATM cell (NNI).

FIG. 3 shows a basic format of an ATM cell to be used in a node network interface (NNI).

As shown in FIG. 3, each ATM cell consists of 53 octets. The first five octets represent the ATM header that identifies the destination, and the remaining 48 octets constitute the information field that carries voice, data, etc., sent from the source terminal. The ATM header contains a virtual path identifier (VPI) that specifies a communication path, a virtual channel identifier (VCI) that specifies a channel to be used in the specified communication path, control bits for PT and CLP, and a CRC calculation value for header error control (HEC). The information field carries information from the terminal, such as voice, data, etc., that has been divided into cells of 48 octets. If the termination does not fill up to 48 octets, any remainder is filled with blanks.

Referring back to FIG. 1, the data from the terminal 11 is broken up into cells by the AAL 13 and a communication path is set up by the ATM switch 14. Using the header data in each ATM cell, the ATM switch 14 performs high speed switching operation by hardware FIG. 1 illustrates how the user terminal 11 connected to the respective communication node 12 communicate with each other over communication paths, i.e., virtual paths (VPs) 16 and virtual channels (VCs) 17 specified therein. If communication path congestion is detected by the ATM switch 14, it discards part of the data transmitted from the transmitting user terminal 11. In this case, the ATM switch 14 checks the CLP (cell loss priority) control bit in the ATM cells whose CLP value is "1". For voice cells which generally have a high level of redundancy and are therefore less affected by cell discarding, the CLP is set to "1", whereas for other cells such as data, modem, facsimile data, etc., the CLP is set to "0".

Figure 4:
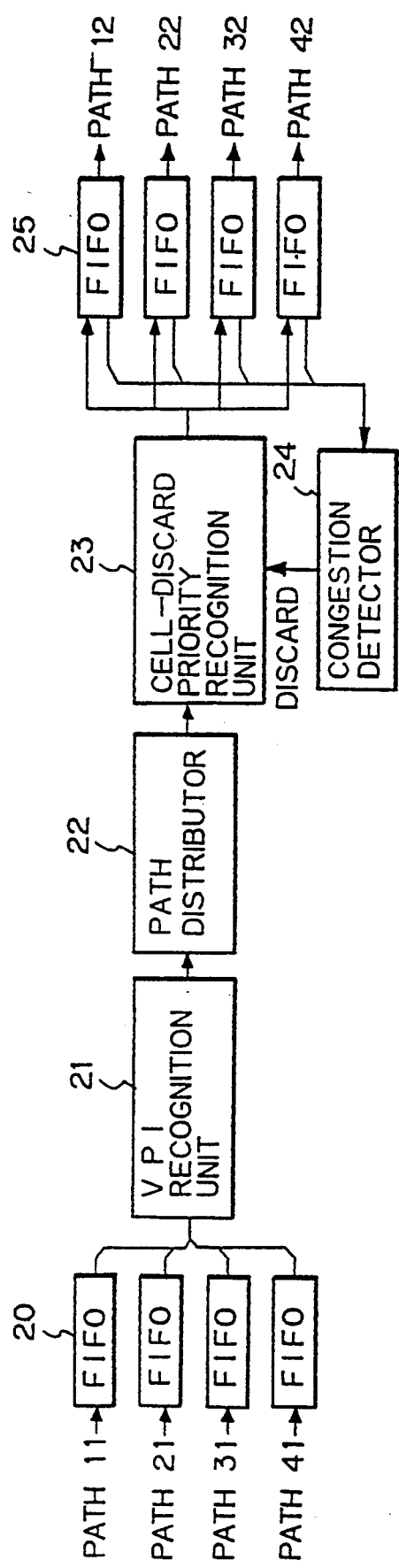
FIG. 4 is a block diagram showing an example of a configuration of an ATM switch.

FIG. 4 is a schematic block diagram showing an example of a configuration of a conventional ATM switch 14.

In FIG. 4, ATM cells output from the AALs 13 are provided to input buffers 20 via respective paths 11–41. The buffers 20 consist of FIFOs (First In First Out) and each output form the FIFOs is input to a VPI recognition unit 21. The VPI recognition unit 21 identifies VPI of the header data in each ATM cell, and thereby controls a path distributor 22 at the next stage to connect each ATM cell to corresponding one of output paths 12–42. The ATM cells distributed by the path distributor 22 are temporary buffered in respective output buffers 25 that consist of FIFOs like the input buffer 20 described above. The ATM cells are then output from the buffers 25 to respective paths 12–42 by replacing idle cells 18 with the ATM cells as shown in FIG. 2.

If communication path congestion situations occurs during communication, the number of the idle cells 18 decreases by the replacement of the ATM cells above described and the number of input cells becomes larger than that of output cells. Therefore the output buffer 25 overflows. When the output buffer 25 overflows, an input disable signal is output from a FIFO of the output buffer 25. A congestion detector 24 detects the input disable signal and thereby informs a cell-discard priority recognition unit 23 of cell-discarding. The cell-discard priority recognition unit 23 checks a CLP control bit that provides cell-discard priority and discards an ATM cell whose CLP value is 1, prior to discarding an ATM cell whose CLP value is 0.

This cell-discarding operation of the ATM communication differs from operation of conventional STM (Synchronous Transfer Mode) communication. In the STM communication, transmit data is synchronously transferred at regular intervals by using a fixedly assigned time-slot. Therefore, the data discard as described above does not occur in the STM communication.

Since cell-discarding occurs in ATM communication, it is necessary to have means for predicting abrupt occurrence of congestion and thereby suitably exchanging a communication path.

Figure 5:
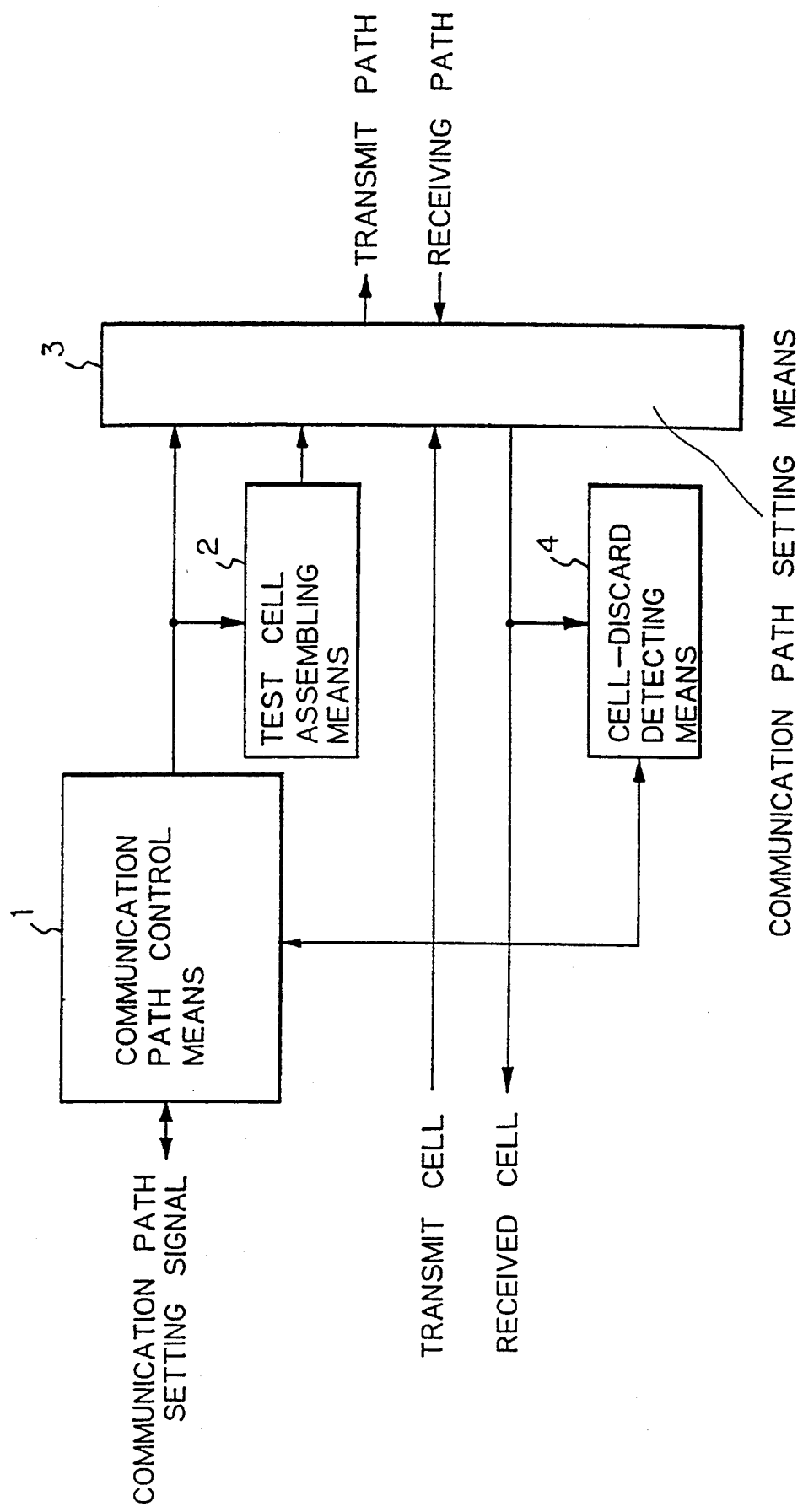
FIG. 5 is a block diagram showing a basic configuration (1) of a communication path setting apparatus according to the invention.

FIG. 5 is a block diagram showing a basic configuration of an apparatus for setting a communication path according to the invention.

In FIG. 5, the communication path control means 1 instructs the test cell assembling means 2 to assemble test cells that have the higher cell-discard priority (CLP=1) in order to check the condition of congestion on a communication path before starting communication. The test cells assembled by the test cell assembling means 2 replace transmit idle cells on the communication path at the communication path setting means 3 and are transmitted to a destination communication node. The test cells are turned around from the destination communication node and are detected by the cell-discard detecting means 4 via the communication path setting means 3 for a so-called loop-back test or two-way test. The cell-discard detecting means 4 compares a series of sequential numbers (1, 2, . . . , n; n is an integer) written in the information field of respective test cells with the number of received test cells. If the numbers coincide, the cell-discard detecting means 4 decides there is no occurrence of cell-discarding and then outputs a communication path setting enable signal to the prescribed communication path control means 1. Thereby, the communication path control means 1 indicates the beginning of communication. Conversely, if does not coincide, the communication path setting is stopped or put into a wait state.

Also, according to another way, the prescribed destination node performs the same operation of receiving the test cells as described above and informs the transmit communication node of the result of test cell-discarding by using an administrative cell. The transmit communication node receives the administrative cell as a response to a one-way test of transmitting the test cells in the transmit direction, and thereby decides whether or not to use the communication path, using the prescribed congestion information contained in the administrative cell.

Figure 6:
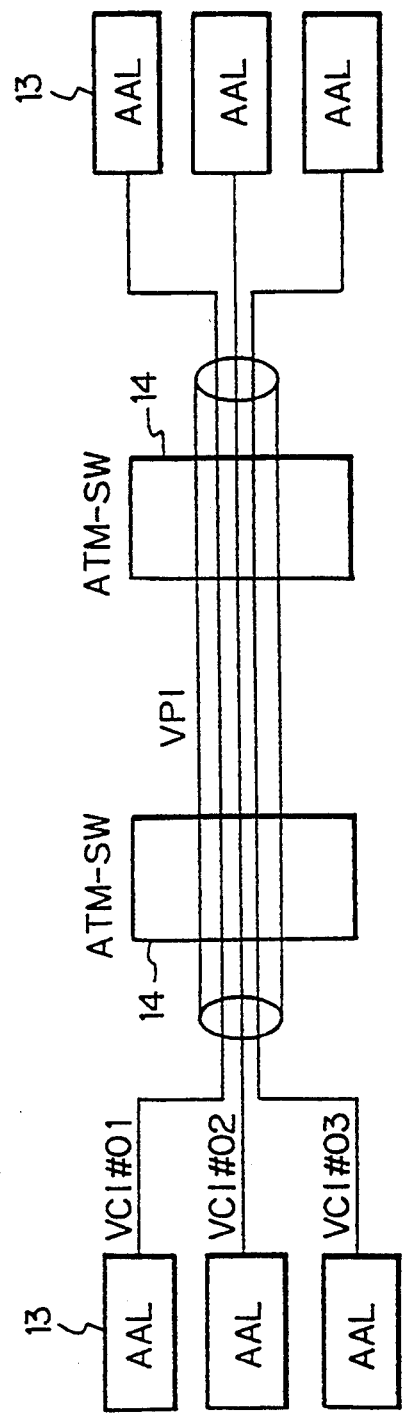
FIG. 6 is a diagram illustrating an example of a network implementing the configuration of FIG. 5.

FIG. 6 is a schematic block diagram illustrating an embodiment of a communication network implementing the configuration of FIG. 5.

The configuration of FIG. 6 is fundamentally the same as configuration of FIG. 1 described above, and the same each block of FIG. 6 as that of FIG. 1 has the same reference numeral.

In comparison with FIG. 5, the communication path control means 1, test cell assembling means 2, and cell-discard detecting means 4 shown in FIG. 5 are included in the function of the AAL 13 shown in FIG. 6. The communication path setting means 3 shown in FIG. 5 is included in the function of the ATM switch 14 shown in FIG. 6.

For example, when the AAL 13 on one side intends to communicate with an AAL 13 on the other side via VCI #01, before starting communication the AAL 13 on the transmitting side assembles test cells (CLP=1) described above and sends the test cells to the AAL 13 on the receiving side via ATM switches 14. FIG. 7 shows an example of such a case in which, on the transmitting side, the AAL 13 assembles a series of test cells each of which has a sequential cell number (cell 1-4). During transmission of the test cells, the ATM switch 14 detects the congestion of VCI #01 and thereby discards a part of the test cells (cell 3). Therefore, in this case, cell discard can be detected by comparing the receiving count of the test cells with the sequential cell number (1, 2. . . , n; n is the transmit cell count) contained in the information field of the received test cell. If those coincide, it is decided that cell discard does not occur and the communication path VCI #01 is not congested. Whereas, if does not coincide, it is decided that cell discard occurs and the communication path VCI #01 is congested. As the transmit cell count (n), either fixed count value arranged between communication nodes or variable count value decided by various congestion situations may be used.

The same test operation as described above is performed in the reverse direction of the communication path VCI #01, and consequently, congestion situations of the two-way communication paths VCI #01 is checked before starting communication. A transmit node may be informed of the result of a congestion test for a transmit way using the test cells by receiving an administrative cell being used for network management sent from a receiving node via a receiving path. Also, a transmit node may test VCI #01 in the both transmit and receiving directions at the same time by receiving loop feedback test cells turned around from a receiving node.

Figure 8:
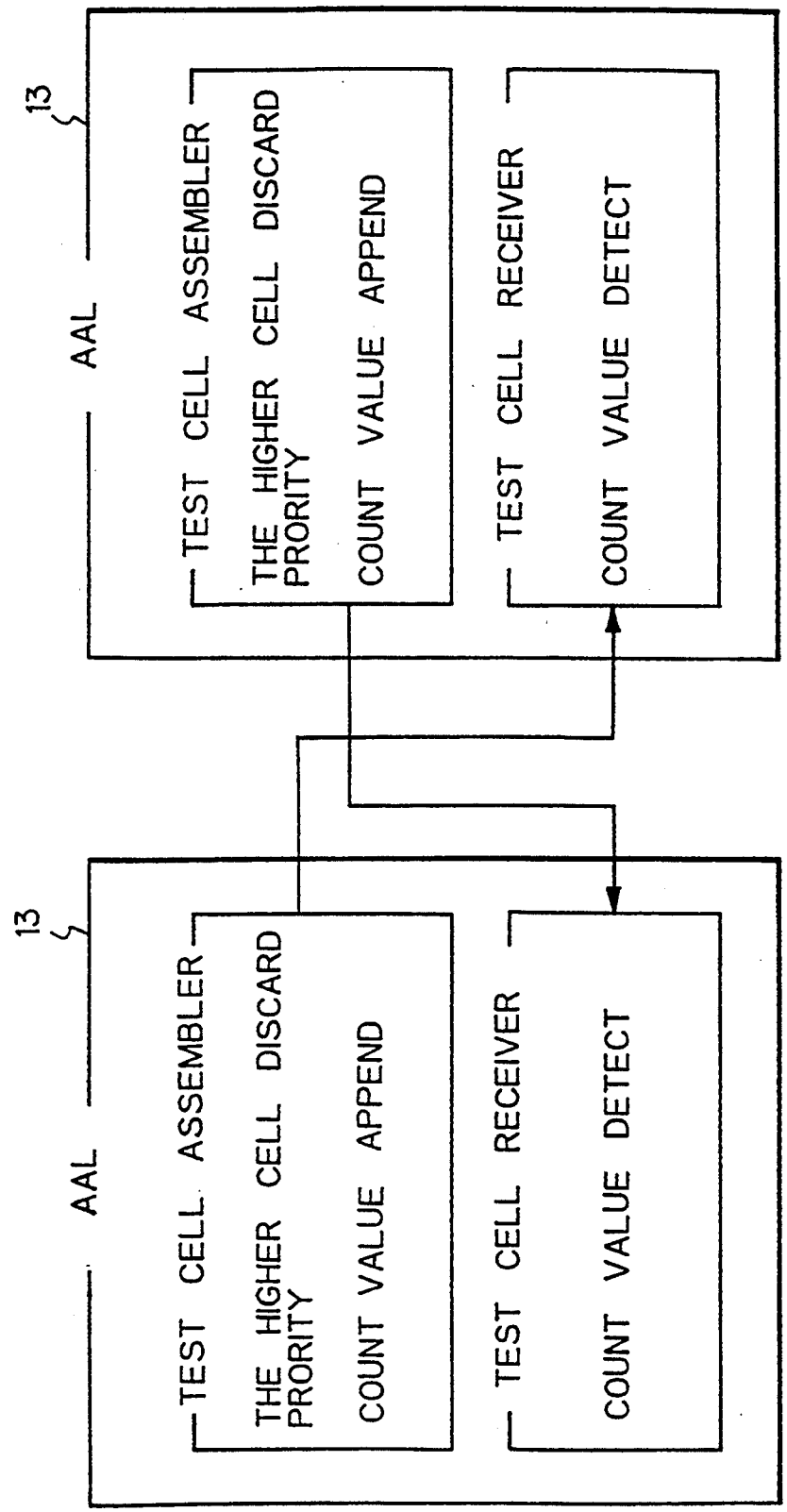
FIG. 8 is a diagram for explaining assembling and receiving of a test cell between AALs which are placed at different nodes.

FIG. 8 is a schematic diagram for explaining the assembly and the receiving of test cells as described above between AALs placed at different nodes. On the one side of AAL 13, the test cell assembler assembles test cells that are provided with the higher cell-discard priority (CLP=1) and are appended with a sequential count value, e.g., 1, . . . , 4, etc. The test cells are transmitted to AAL 13 on the receiving side. The test cell receiver of the AAL 13 detects the sequential count values contained in the received test cells and then detects congestion situations by the prescribed comparison.

Figure 9:
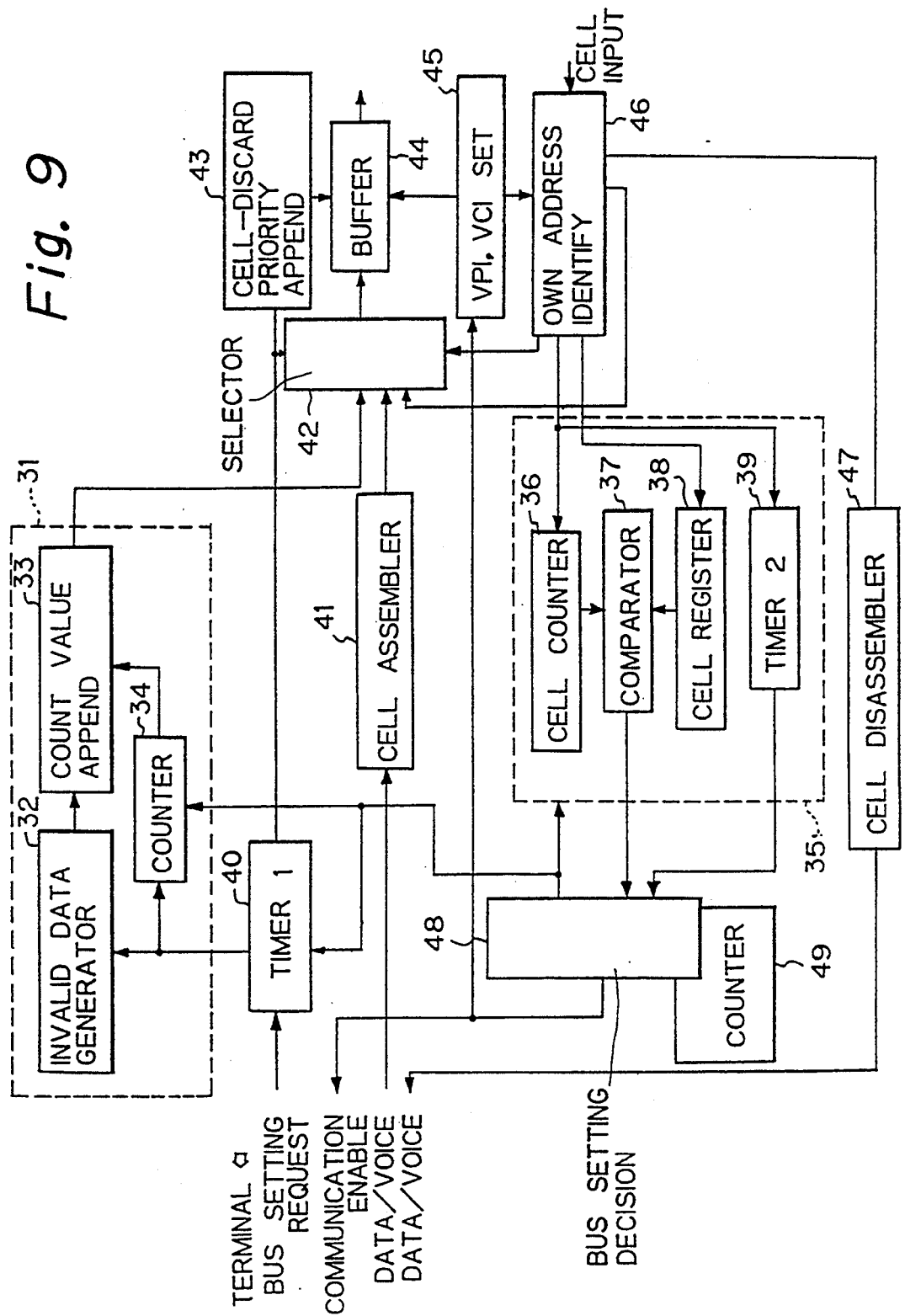
FIG. 9 is a block diagram illustrating one embodiment of a configuration of an AAL according to the invention shown in FIG. 5.

FIG. 9 is a block diagram illustrating one embodiment of a configuration of an AAL according to the invention shown in FIG. 5. FIG. 9 principally shows two sections of the test cell assembling means 2 and the cell-discard detecting means 4 shown in FIG. 5. The communication path control means 1 and the communication path setting means 3 shown in FIG. 5 are respectively positioned on both left-right sides of FIG. 9 (Although not shown in FIG. 9), i.e., terminal side, ATM switch side.

Figure 10B:
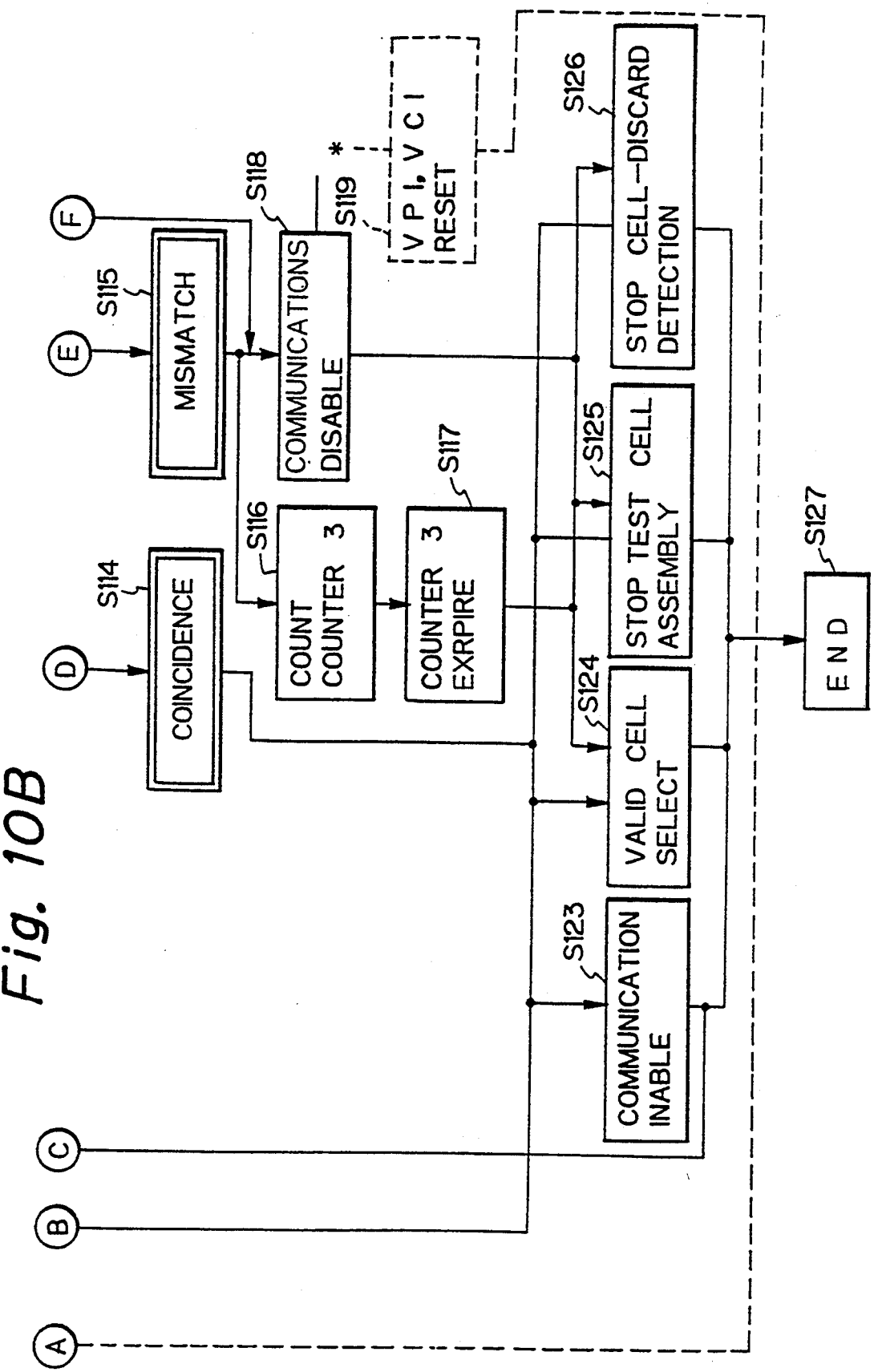

FIG. 10 is a flowchart showing the positional orientation of FIG. 10(A) and 10(B). FIG. 10(A) and 10(B) are flowcharts showing control flow of an AAL shown in FIG. 9.

Next, the operation of circuits shown in FIG. 9 is explained with reference to the flowcharts of FIG. 10.

In FIG. 9, initially, by a path setting request indicated by the communication path control means 1 (not shown in FIG. 9), a transmit request flag (TRF) that designates its own node is a transmit node is set to "1" (S101) and the timer 1 circuit 40 starts (S103). The timer 1 circuit 40 outputs a trigger signal at regular intervals (S104), and the invalid data generator circuit 32 assembles a test cell that has a fixed data pattern for the test cell by the trigger signal. Reference numeral 31 is a test cell assembling unit (shown by a dotted line). The counter circuit 34 is incremented (1, 2, . . . ) by each trigger signal described above. The count value of the counter circuit 34 that corresponds to the number of assembled test cells is written onto each information field of the test cell by the count value appending circuit 33, and thereafter the test cells are outputs from the test cell assembling unit 31 (S105). When the timer 1 circuit 40 reaches the final count (S106), the prescribed assembly and transmission of the test cells is stopped and the transmit request flag (TRF) is set to "0" (S107). Until that time, the predetermined number n (n is an integer) of test cells is output.

The prescribed test cells are provided to a first input port of the selector circuit 42 and a second input port of the selector circuit 42 is provided with an output signal output from the cell assembler circuit 41 that assembles transmit cells from data sent from a terminal device. The selector circuit 42 selects the first input port on the test cell side by an output signal from the timer 1 circuit 40 until reaching the expiration of the timer 1 described above (S106). For a period of selecting the test cell side, the cell-discard priority appending circuit 43 writes the higher cell loss priority (CLP=1) onto each of the test cells temporally stored in the buffer circuit 44. Each test cell (CLP=1) is transmitted in order via predetermined time-slot form the buffer circuit 44 to a destination communication node.

Next, the operation of receiving sections are explained.

The own address identifying circuit 46 identifies a test cell having own address VPI, VCI from a cell input signal (S108), and distributes the prescribed test cell to the cell discard detecting unit 35 (shown by a dotted line) if the value of the transmit request flag is 1 (TRF =1) or distributes the prescribed test cell to the selector circuit 42 if the TRF=0 (S109), or distributes a non-test cell to the cell disassembler circuit 47.

"TRF=0" means that own node is a receiving node of the test cell, and in this embodiment the received test cells are provided to a third input port of the selector circuit 42 so as to return the received test cells to a transmit node of the test cells without processing, that is a so-called loop-back mode (S110). The selector circuit 42 selects the third input port and outputs the received test cells by a control signal provided by the own address identifying circuit 46. Whereas "TRF=1" means that the own node is a transmit node of the test cell, and the received test cells returned from the receiving node as described above are provided to the cell discard detecting unit 35 so as to check discarding of the test cells explained as follows (S111–S126).

In the cell discard detecting unit 35, the cell counter circuit 36 is incremented by a cell receiving pulse output from the prescribed own address identifying circuit 46, and the cell register 38 temporarily stores a series of the prescribed cell numbers written in each received test cell (S111, S112). The timer 2 circuit 39 is a so-called re-triggerable counter circuit that starts counting by receiving the first test cell (S120) and restarts counting by each cell receiving pulse output from the prescribed own address identifying circuit 46 (S121). When the value of receiving interval between one received cell and the next received cell is greater than that of predetermined receiving interval, the timer 2 circuit 39 reaches the final count and thereby outputs a pulse signal indicating a defect receive (S122).

The comparator 37 compares the count value of the cell counter circuit 36 (a received cell count) with the value of the cell register 38 (a received sequential number) (S113). When the count value of the cell counter circuit 36 coincides with the value of the cell register 38 at the prescribed n times (S114), the comparator 37 outputs a communication enable signal (S123) to the bus setting decision circuit 48. According to the communication enable signal, the bus setting decision circuit 48 stops assembling the test cells by clearing the timer 1 circuit 40 (S125), and detecting the cell-discarding (S126), and selects the transmit cell side (the prescribed second input port of the selector circuit 42) (S124). The operation of the bus setting decision circuit 48 is completed (S127) thereafter.

In a case that the prescribed comparison does not coincide (S115), the bus setting decision circuit 48 outputs a communication disable signal (S118), and if the other communication paths VPI, VCI are able to use, any one of the other communication paths VPI, VCI is set instead of the prescribed path decided in the condition of congestion, and thereafter test cells are transmitted again onto the newly selected communication path UPI, VCI to test the congestion situations of that path (each step after step S103 is performed again).

The counter 3 circuit 49 counts up the prescribed communication disable signal (S116), and when the count value of the counter 3 circuit 49 reaches a predetermined count value that means it is impossible to avoid the occurrence of congestion, the counter 3 circuit 49 instructs the bus setting decision circuit 48 to complete the congestion test. The bus setting decision circuit 48 implements the initializing process (S124, S125, S126) similar to the normal completion described above and thereby completes process (S127).

Next, in a case of receiving other cells except for the prescribed test cells, the cell disassembler circuit 47 disassembles an information cell, e.g., data cell, voice cell, etc., and an administrative cell used for management and maintenance of a network.

In this embodiment, the administrative cell is used to inform the result of one way congestion test (in the transmit direction) that is performed at the cell-discard detecting unit 35 of a destination node as described above (S111–S126). However, in the case of using the administrative cell to notify the result of one way congestion test, there is no need for the prescribed loop feedback operation of test cells, which is used for the two way congestion test. Therefore, since the prescribed step S102 of a transmit section and the prescribed steps S109, S110 of a receiving section (shown in FIG. 10) are used for deciding the performance of the loop feedback operation of test cells as described above, these steps S102, S109, S110 are not used in this case, and as shown by a dotted line in FIG. 10(A) step S101 is directly combined with step S103 and also step 108 is directly combined with steps S111 and S120.

A decision which way to use, i.e., the one way congestion test (use of an administrative cell) or the two way congestion test (use of loop back), is made by the arrangement between communication nodes. The prescribed arrangement about which way to use may be fixedly set up between each communication node or flexibly changed corresponding to each destination node or a kind of transmit information, e.g., facsimile (one way), voice (two way), etc. In the latter case, a predetermined communication protocol is used to determine the prescribed arrangement between communication nodes every time when making a call, before starting a congestion test.

FIG. 11 is a block diagram showing a basic configuration of a communication path setting apparatus according to the invention.

In FIG. 11, the idle cell monitoring means 7 monitors the number of idle cells flowing through a communication path for a unit time before the communication path control means 5 sets up the communication path so as to check the condition of congestion on the communication path. The bandwidth recognizing means 6 recognizes a bandwidth required for a terminal equipment connected to the communication path to communicate in accordance with terminal information provided by the system side. The comparing means 8 compares the prescribed bandwidth with a bandwidth corresponding to the prescribed number of idle cells. If the latter is greater than the former, which means a line capacity is greater than the communication equipment capacity, the comparing means 8 outputs a communication path setting enable signal to the communication path control means 5. The communication path control means 5 controls the communication path setting means 9 in accordance with the communication path setting enable signal. Namely, the communication path control means 5 connects transmit cells to the prescribed communication path and indicates the beginning of communication. Conversely, if the latter is smaller than the former, the prescribed path connection is stopped or put into a waiting state.

Figure 12:
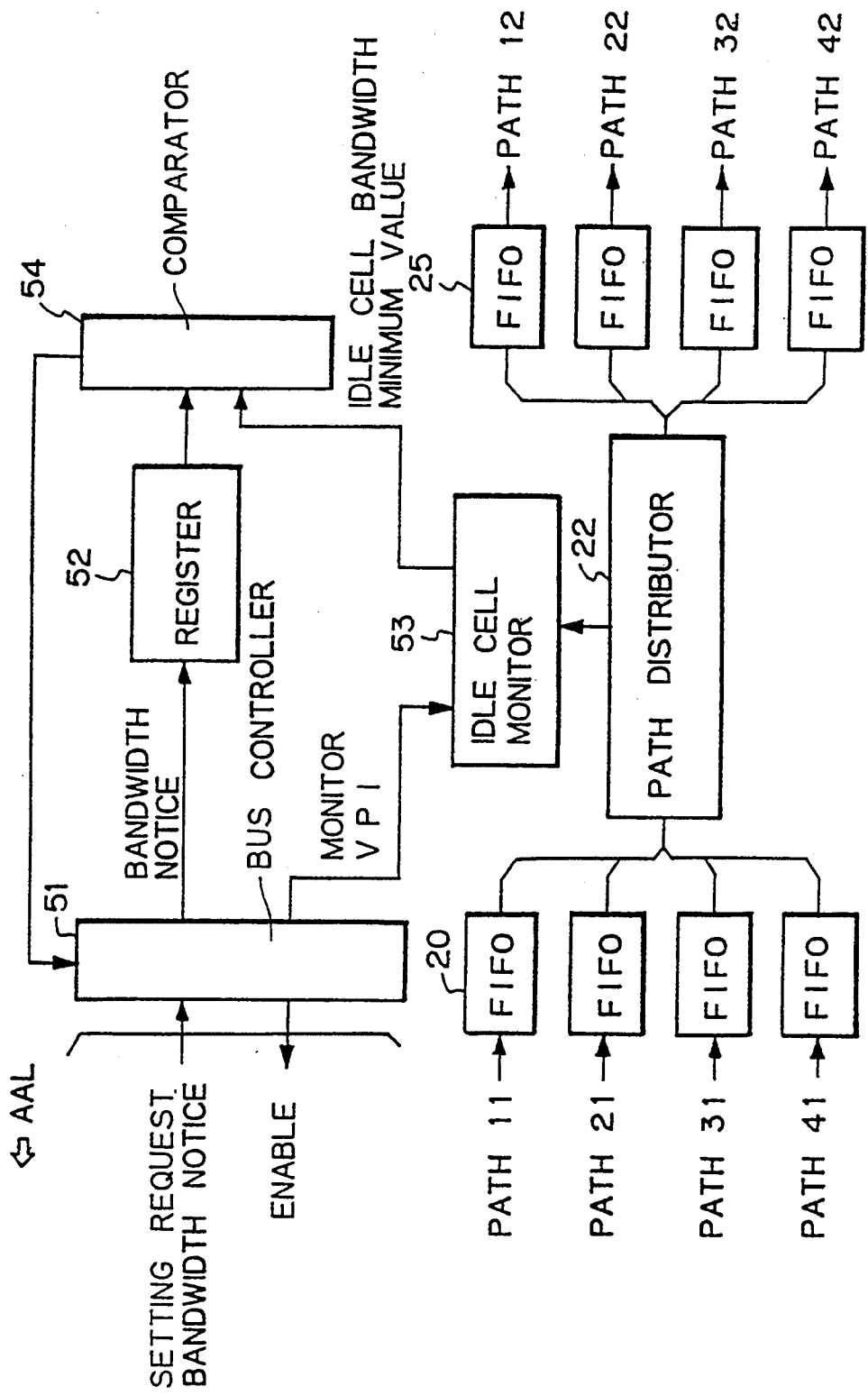
FIG. 12 is a block diagram illustrating an embodiment (1) according to the invention shown in FIG. 6.
Figure 13:
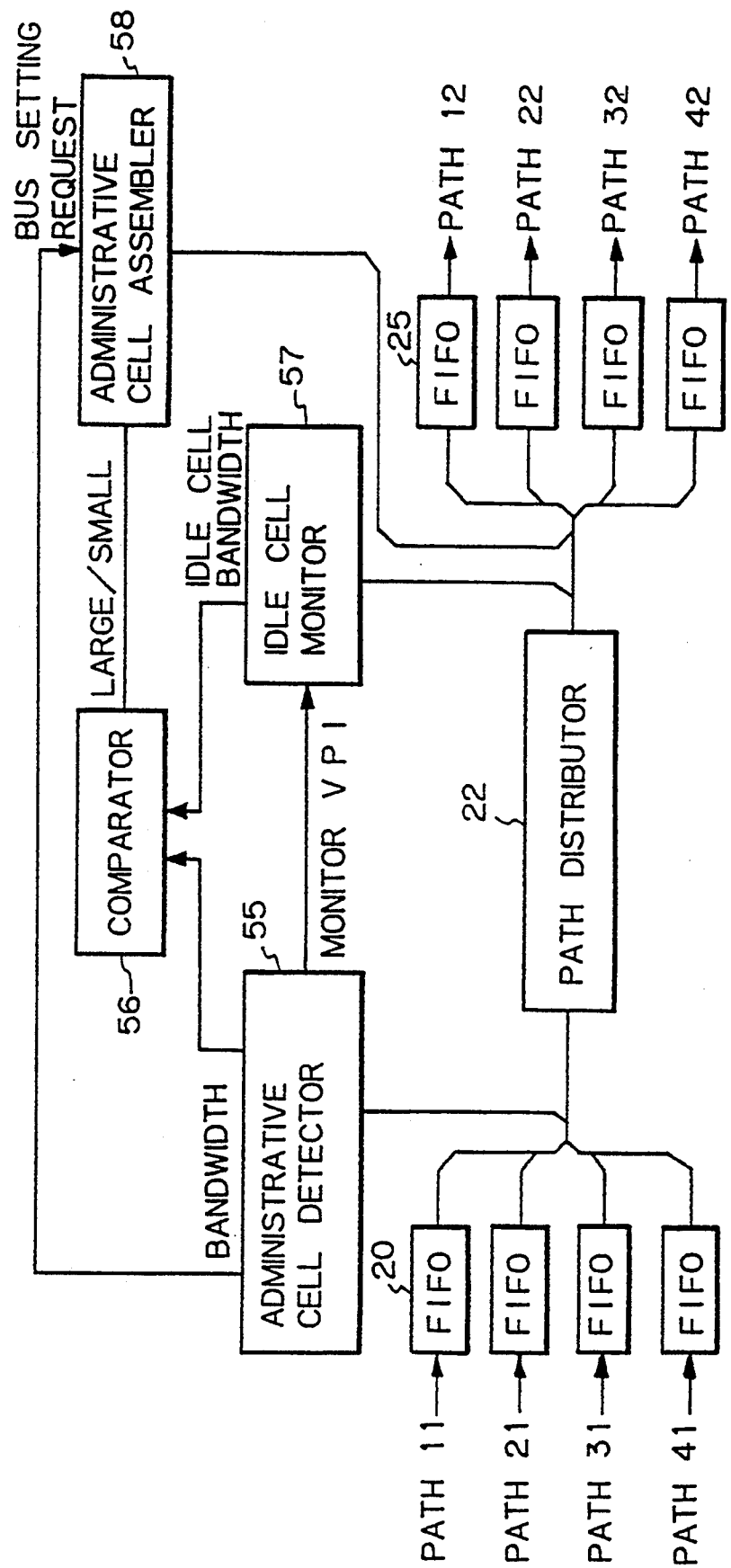
FIG. 13 is a block diagram illustrating an embodiment (2) according to the invention shown in FIG. 6.

FIG. 12 and FIG. 13 are block diagrams illustrating two embodiments according to the invention shown in FIG. 11.

Comparing FIG. 12 with FIG. 11, the bus control circuit 51, register 52, comparator 54, and idle cell monitor circuit 53 shown in FIG. 12 respectively correspond to the communication path controlling means 5, bandwidth recognizing means 6, comparing means 8, and idle cell monitoring means 7 shown in FIG. 11. The ATM switch circuit that consists of the FIFOs 20, 25, and path distributing circuit 22 shown in FIG. 12 correspond to the communication path setting means 9 shown in FIG. 11.

Comparing FIG. 13 with FIG. 11, the administrative cell detector circuit 55 shown in FIG. 13 corresponds to the communication path controlling means 5 and bandwidth recognizing means 6 shown in FIG. 11. The comparator 56, and idle cell monitor circuit 57 shown in FIG. 13 respectively correspond to the comparing means 8, and idle cell monitoring means 7 shown in FIG. 11. The same ATM switch circuit shown in FIG. 13 as that shown in FIG. 12 corresponds to the communication path setting means 9 shown in FIG. 11. The blocks in FIG. 13 correspond to blocks in FIG. 12 have the same reference numeral.

In FIG. 12, the bus control circuit 51 is an I/O interface device and accepts a bus setting request from the system side and sends terminal information to the idle cell monitor circuit 53 and the register 52 at the next stage respectively. The register 52 stores bandwidth information mainly related to the transmission rate of a terminal equipment, e.g., 1,200 bits/s, 64 kbits/s, etc. The idle cell monitor circuit 53 monitors the number of idle cells flowing through a communication path VPI, which is indicated by the prescribed bus control circuit 51, for a unit time over the path distributor 22 of the prescribed ATM switch. For example, if the idle cell monitor circuit 53 detects ten idle cells for one second on one communication path, it is possible to connect a terminal equipment having the maximum transmission rate of 3,840 bits/s to the communication path. Because the information field of one cell contains 384 bits that is 48 bytes × 8 bits = 384 bits and thus a bandwidth of the communication path becomes 3840 bits that is 384 bits × 10 cells/sec = 3,840 bits/sec. The comparator 54 compares the transmission rate of a terminal equipment connected to a communication path with the bandwidth of the communication path. If the bandwidth of the communication path is greater than that of the terminal equipment, the comparator 54 outputs a communication enable signal. In the case above described, since the bandwidth of the communication path is 3,840 bits/sec, a 1,200 bits/sec terminal equipment can communicate which another terminal equipment via the communication path, however a 64 Kbits/sec terminal equipment cannot.

An embodiment of the invention shown in FIG. 13 uses the same method as described in FIG. 12 in order to detect or predict congestion. However, the embodiment of FIG. 13 differs from that of FIG. 12 in that an administrative cell is used for a communication path setting control in FIG. 13, whereas the prescribed bus control circuit 51 is used in FIG. 12. The administrative cell is assembled by appending the ATM header in which PT bits are set to "011" in the information field of an ATM cell and transferred onto a usual communication path used by information cells.

In FIG. 13, the administrative cell detecting circuit 55 recognizes e.g., terminal information and communication path information (VPI), etc., in the administrative cell sent from AALs via communication paths, and operates the comparator 56 and the idle cell monitor circuit 57 as described above. The comparator 56 provides the result of comparison to the administrative cell assembling circuit 58. The administrative cell assembling circuit 58 assembles an administrative cell having information of the result of comparison and transmits the administrative cell as the prescribed communication enable signal to the AALs or the prescribed ATM switch. Therefore, in this embodiment circuits related to bus control are not needed.

As described above, according to the invention, by using test cells that have the higher cell-discard priority, it is possible to suitably detect or predict the occurrence of congestion on a communication path and thereby to prevent cell-discarding.

Further, according to the invention, the same performance and effect as described above, i.e., the detection and prediction of the occurrence of congestion and the prevention of cell-discarding, etc., becomes possible by comparing a bandwidth of a terminal equipment connected to a communication path with the number of idle cells per unit time flowing through the communication path, without using the prescribed test cells.

We claim:

1. An apparatus for testing a communication path between first and second nodes in a communication system, wherein the communication path connects the first and second nodes, and cells, including test cells and non-test cells, are transferred between the first and second nodes via the communication path by replacing idle cells resident in time slots with the cells to be transferred, the apparatus comprising:

communication path control means for initiating a test of the communication path and producing a test signal to indicate the initiation of a test;

test cell assembling means for receiving the test signal from the communication path control means and assembling a series of sequentially numbered test cells when the test signal indicates the initiation of a test;

communication path setting means, coupled to the test cell assembling means, for replacing idle cells resident in time slots with the test cells, outputting the test cells onto the communication path and receiving cells from the communication path that are transferred from the second node, the second node receiving the test sells via the communication path and outputting a response signal on the communication path in response to the received test cells; and cell-discard detecting means for receiving the response signal from the second node via the communication path, detecting a level of cell activity on the communication path based on the response signal, and providing an enable control signal as an output when detecting the level of cell activity is below a set activity level and providing a disable control signal as an output when detecting that the level of cell activity is above the set activity level;

the communication path control means receiving the output of the cell-discard detecting means and allowing non-test cells to be transmitted from the first node onto the communication path when the enable control signal is received and not allowing non-test cells to be transmitted from the first node onto the communication path when the disable control signal is received.

2. An apparatus as set forth in claim 1, wherein each test cell has an information field and the test cell assembling means comprises:

an invalid data generating unit which fills the information, field of a respective test cell with invalid data;

a counter unit which generates a respective sequential number corresponding to each test cell; and a count value appending unit which appends the respective sequential number to the information field of the corresponding test cell.

3. An apparatus as set forth in claim 1, wherein the test cells transmitted by the first node are received by the second node and transmitted back to the first node by the second nodes, the cell-discard detecting means comprises:

a cell counter unit which receives and counts the transmitted back test cells to produce a count value;

a cell register unit which temporarily stores the respective sequential number contained in a received, transmitted back test cell; and a comparing unit which compares the count value with the sequential number stored in the cell register unit to detect whether test cells are being discarded.

4. An apparatus as set forth in claim 1, wherein test cells transmitted by the first node are received by the second node and transmitted back by the second node to the first node, the transmitted back test cells being the response signal detected by the cell-discard detecting means.

5. An apparatus as set forth in claim 4, wherein the second node includes a feedback unit which returns test cells received from the first node to the communication path without further processing of the received test cell by the second node.

6. An apparatus as set forth in claim 1, wherein the response signal received by the cell-discard detecting means is an administrative cell that transmits network management information to the first node from the second node.

7. An apparatus as set forth in claim 6, wherein the second node includes a means for detecting test cells transmitted from the first node to the second node and transmitting the administrative cell to the first node.

8. An apparatus as in claim 1, wherein the second node receives non-test cells from the communication path and the second node includes a cell discarding means for discarding cells on the communication path when the level of cell activity on the communication path is greater than a predetermined level, the test cells being discarded before the non-test cells and the response signal indicates the cells which have been discarded.

9. An apparatus as in claim 4, wherein the second node receives non-test cells from the communication path and the second node includes a cell discarding means for discarding cells on the communication path when the level of cell activity on the communication path is greater than a predetermined level, the test cells being discarded before the non-test cells and the response signal indicates the cells which have been discarded.

10. An apparatus for testing a communication path in a communication system, wherein communication equipment is connected to the communication path, and cells, including idle cells, are transferred along the communication path, the apparatus comprising:

communication path control means for outputting a path signal indicating a communication path to be tested;

communication path setting means for receiving the path signal from the communication path control means and arranging the communication path in accordance with the path signal;

bandwidth recognizing means for recognizing the communication bandwidth of the communication equipment and outputting a corresponding signal;

idle cell monitoring means for monitoring, during a predetermined time interval, the number of idle cells transferred through the communication path to determine an idle cell bandwidth and outputting a corresponding signal; and comparing means for receiving the output of the bandwidth recognizing means and the output of the idle cell monitoring means, comparing the output of the bandwidth recognizing means and the output of the idle cell monitoring means and outputting an enable control signal when the idle cell bandwidth is greater than the communication bandwidth and outputting a disable control signal when the idle cell bandwidth is smaller than the communication bandwidth;

the communication path control means receiving the output of the comparing means and controlling the communication path setting means so that the communication equipment can transmit cells onto the communication path when an enable control signal is received and controlling the communication path setting means so that the communication equipment cannot transmit cells onto the communication path when a disable control signal is received.

11. A method for testing a communication path between first and second nodes in a communication system, wherein the communication path connects the first and second nodes, and cells, including test cells and non-test cells, are transferred between the first and second nodes via the communication path by replacing idle cells resident in time slots with the cells to be transferred, the method comprising:

initiating a test of the communication path;

assembling a series of sequentially numbered test cells when the test is initiated;

replacing idle cells resident in time slots with the test cells and outputting the test cells onto the communication path, the second node receiving the test cells via the communication path;

outputting a response signal by the second node in response to the received test cells;

receiving the response signal by the first node;

detecting a level of cell activity on the communication path based on the response signal;

providing an enable control signal when detecting that the level of cell activity is below a set activity level;

providing a disable control signal when detecting that the level of cell activity is above the set activity level;

allowing non-test cells to be transmitted from the first node onto the communication path when the enable control signal is provided; and not allowing non-test cells to be transmitted from the first node onto the communication path when the disable control signal is provided.

12. A method as set forth in claim 11, wherein further comprising:

receiving by the second node, test cells transmitted by the first node; and transmitting back, by the second node to the first node, the test cells received by the second node, the transmitted back test cells being the response signal; wherein the step of detecting the level of cell activity includes comparing the sequential number of each received test cell with the number of received test cells at the time the respective test cell is received;

the step of providing an enable control signal includes providing the enable control signal when the sequential number of each received test cell coincides with the total number of received test cells at the time that the respective received test cell is received; and the step of providing a disable control signal includes providing the disable control signal when the sequential number of each received test cell does not coincide with the total number of received zest cells at the time that the respective received test cell is received.

13. A method as set forth in claim 12, wherein the step of transmitting back includes returning, by the second node, received test cells to the communication path without further processing of the received test cells by the second node.

14. A method as set forth in claim 11, wherein the response signal is an administrative cell containing information and the step of detecting the level of cell activity includes detecting the level of cell activity from the information contained in the administrative cell.

15. A method as set forth in claim 14, further comprising:

comparing by the second node, the sequential number of each received test cell with the total number of received test cells at the time the respective received test cell is received, wherein the information contained in the administrative cell indicates the result of the comparison.

16. A method as in claim 11, further comprising:

discarding cells received by the second node when the level of cell activity on the communication path is greater than a predetermined level, the test cells being discarded before non-test cells and the response signal indicates the cells which have been discarded.

17. A method as in claim 12, further comprising:

discarding cells received by the second node when the level of cell activity on the communication path is greater than a predetermined level, the test cells being discarded before non-test cells and the response signal indicates the cells which have been discarded.

18. A method for testing a communication path in a communication system, wherein communication equipment is connected to the communication path and cells, including idle cells, are transferred along the communication path, the method comprising:

indicating a communication path to be tested;

recognizing the communication bandwidth of the communication equipment;

monitoring, during a predetermined time interval, the number of idle cells transferred through the communication path to determine an idle cell bandwidth of the communication path;

comparing the communication bandwidth with the idle cell bandwidth;

providing an enable control signal when the idle cell bandwidth is greater than the communication bandwidth;

providing a disable control signal when the idle cell bandwidth is smaller than the communication bandwidth;

allowing the communication equipment to transfer cells to the communication path when the enable control signal is provided;

not allowing the communication equipment to transfer cells to the communication path when the disable control signal is provided.

19. An apparatus for testing a communication path between first and second nodes in a communication system, wherein the communication path connects the first and second nodes, and fixed size data blocks, including test blocks and non-test blocks, are transferred between the first and second nodes via the communication path by replacing idle blocks resident in time slots with the data blocks to be transferred, the apparatus comprising:

communication path control means for initiating a test of the communication path and producing a test signal to indicate the initiation of a test;

test block assembling means for receiving the test signal from the communication path control means and assembling a series of sequentially numbered test blocks when the test signal indicates the initiation of a test;

communication path setting means, coupled to the test block assembling means, for replacing idle blocks resident in time slots with the test blocks, outputting the test blocks onto the communication path and receiving blocks from the communication path that are transferred from the second node, the second node receiving the test blocks via the communication path and transmitting back the received test blocks to the first node; and block-discard detecting means for receiving the transmitted back test blocks from the second node via the communication path, comparing the sequential number of each transmitted back test block with the total number of transmitted back test blocks received by the first node at the time the respective transmitted back test block is received by the first node, providing an enable control signal as an output when the result of the comparison is that the sequential number is equal to the number of transmitted back test blocks received by the first node, and providing a disable control signal as an output when the result of the comparison is that the sequential number is not equal to the number of transmitted back test blocks received by the first node;

the communication path control means receiving the output of the block-discard detecting means and allowing non-test blocks to be transmitted from the first node onto the communication path when the enable control signal is received and not allowing non-test blocks to be transmitted from the first node onto the communication path when the disable control signal is received.

* * * * *

UNITED STATES PATENT AND TRADEMARK OFFICE
CERTIFICATE OF CORRECTION

PATENT NO. : 5,373,504
DATED : December 13, 1994
INVENTOR(S) : Kenji TANAKA et al.

It is certified that error appears in the above-indentified patent and that said Letters Patent is hereby corrected as shown below:

```
Col. 1, lines 31, delete "such". (first occurrence)
Col. 4, line 31, after "hardware", insert a period (".");
      Line 67, after "Therefore", insert a comma (",").
Col. 10, line 27, delete "which" and insert therefor --with--.
Col. 13, line 45, delete "wherein".
```

Signed and Sealed this

Seventh Day of March, 1995

Attest:

BRUCE LEHMAN

Attesting Officer

Commissioner of Patents and Trademarks